Feb. 19, 1924.

L. B. WHIPPLE

PATTERN COPYING MACHINE

Filed Aug. 11, 1919

INVENTOR-
Leland B. Whipple
By his Attorney
Nelson N. Howard.

Feb. 19, 1924.
L. B. WHIPPLE
1,483,960
PATTERN COPYING MACHINE
Filed Aug. 11, 1919
3 Sheets-Sheet 2
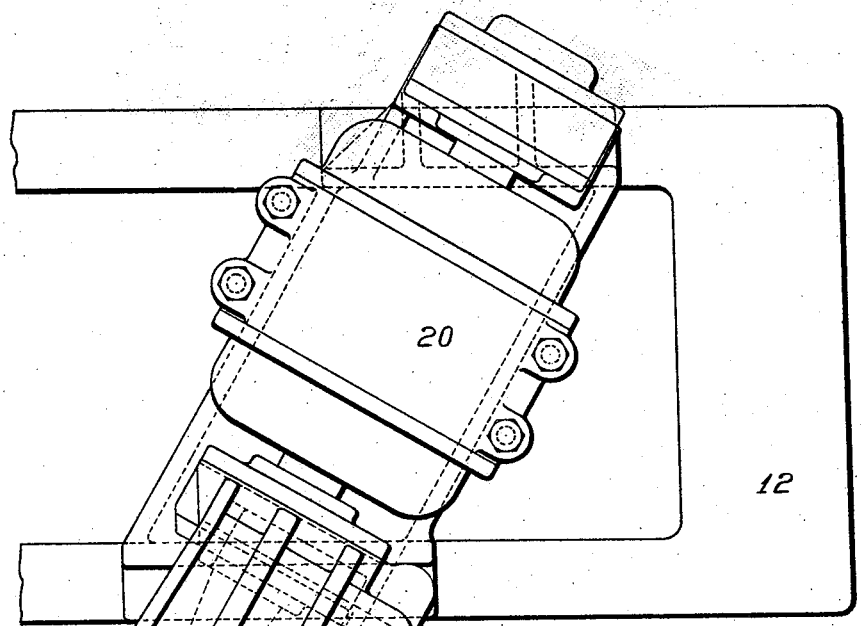
Fig. 2.
INVENTOR-
Leland B. Whipple
By his Attorney,
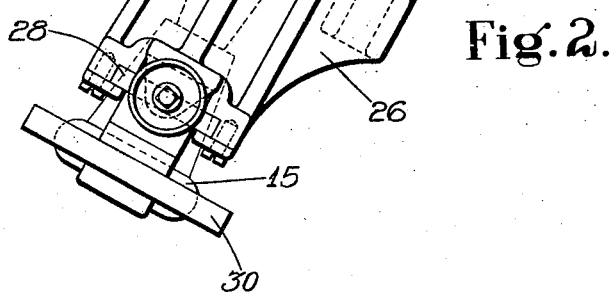

Feb. 19, 1924.

L. B. WHIPPLE 1,483,960

PATTERN COPYING MACHINE

Filed Aug. 11, 1919

INVENTOR-
Leland B. Whipple
By his Attorney,
Nelson W. Howard

Patented Feb. 19, 1924.

1,483,960

UNITED STATES PATENT OFFICE.

LELAND B. WHIPPLE, OF ROCHESTER, NEW YORK, ASSIGNOR TO FITZ-EMPIRE DOUBLE PIVOT LAST COMPANY, OF AUBURN, MAINE, A CORPORATION OF MAINE.

PATTERN-COPYING MACHINE.

Application filed August 11, 1919. Serial No. 316,804.

*To all whom it may concern:*

Be it known that I, LELAND B. WHIPPLE, a citizen of the United States, residing at Rochester, in the county of Monroe and State of New York, have invented certain Improvements in Pattern-Copying Machines, of which the following description, in connection with the accompanying drawings, is a specification, like reference characters on the drawings indicating like parts in the several figures.

This invention refers to pattern-copying machines, and is described more particularly with reference to last lathes, though the invention is not therefore to be understood as limited thereto.

In cutting lasts from a model in a machine of this type, difficulty in accurate reproduction is experienced in case the last cut is of larger or smaller periphery than the model. The fundamental cause of this difficulty is the irregular nature of the last shape, which places the point of contact of the model wheel and last generally at a distance from the line joining the center of model wheel and center of rotation of the section of the last being reproduced. The action of the width grader relatively displaces the centers of model wheel and cutter in a direction parallel to this line. The ultimate result is that sharp corners such as the junction between the tread face and upper surface of the forepart of a last are imperfectly reproduced when the width grader setting is substantially different from zero.

In order to correct this difficulty, it is necessary that the system composed of the model wheel and model shall be geometrically similar to that composed of the cutter and work, so that for example if the width grader is magnifying the lateral dimensions of the model in the ratio 9:8, the diameters of the cutter and model wheel should also be in the same ratio, 9:8, and it is therefore now the custom to furnish three model wheels of 9.3, 10 and 10.7 inches diameter with the 10 inch cutter head lathe; the large and small wheels being used in the extremes of width grading.

This practice has failed to create satisfactory conditions for the reasons, among others, first, that the change from one model wheel to another is so troublesome as to be seldom made, the last manufacturer preferring to cut the last too full and then to shape up the corners on the said wheel by hand; and second, that even if the change is made, the new wheel, being of fixed diameter, will accomplish the entire correction of the difficulty only for one setting of the width grader, more or less of the advantage of the change being lost on all other settings.

It is a principal object of my invention to obviate the difficulties above described by varying the effective size of the cutter head instead of the model wheel, and in particular to provide means whereby the cutter head may be adjusted to any desired effective diameter with speed, convenience, and accuracy.

Accordingly, a feature of the invention resides in a novel copying lathe organization comprising a width grading mechanism, a model wheel, a cutter head having adjustable blades and an adjustable gage for conveniently setting the blades to any desired cutter head diameter. Preferably the adjustable gage will be controlled by a micrometer, whereby the adjustment may be made with the utmost accuracy.

These and other features of the invention, comprising various arrangements and combinations of parts will be understood from the following description which shows a preferred embodiment of the invention, selected for purposes of illustration and shown in the drawings in which, Fig. 1 is a side elevation of the machine;

Fig. 2 is an enlarged plan of the cutter head and setting mechanism;

Figure 1:
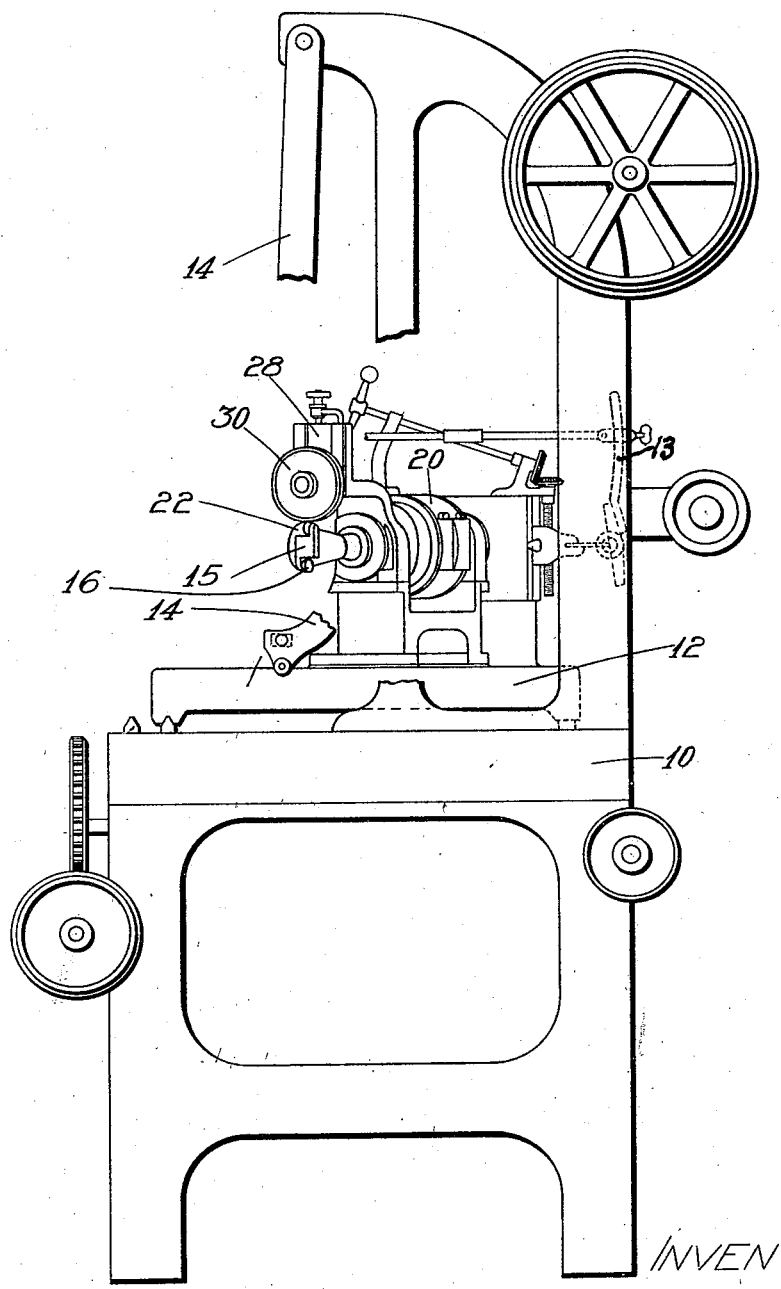
Figure 3:
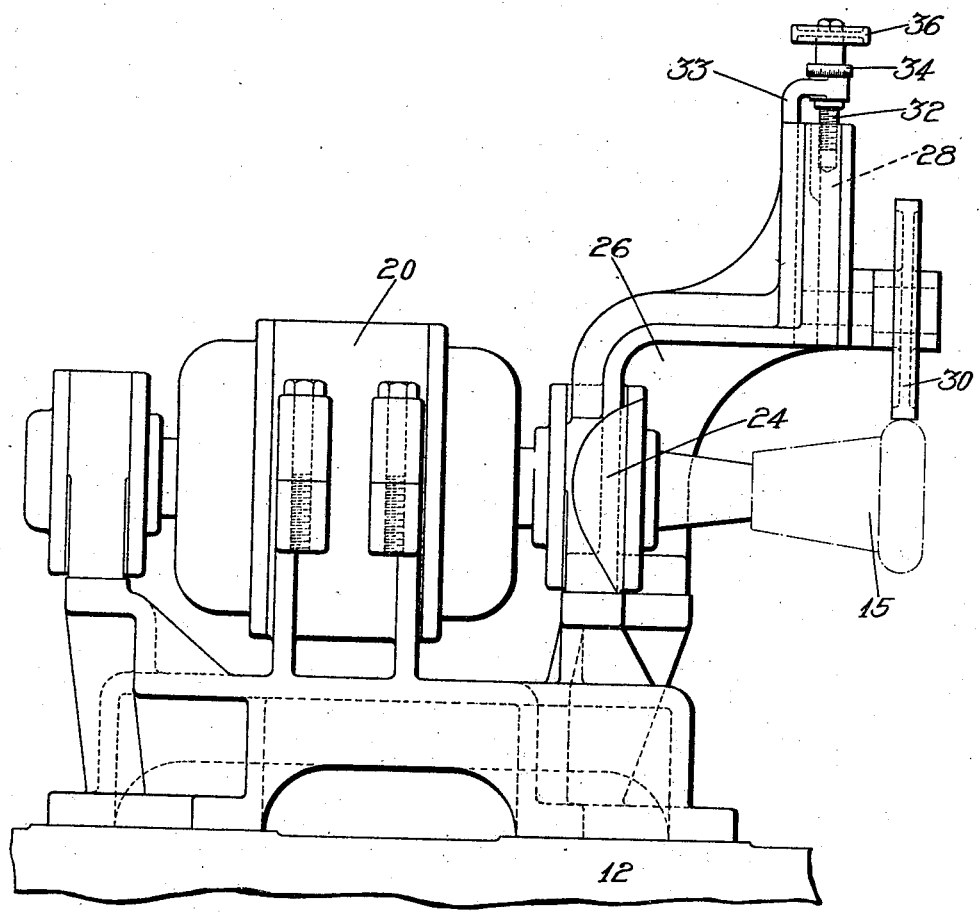
Fig. 3 is a front elevation of the mechanism shown in Fig. 2.
Figure 4:
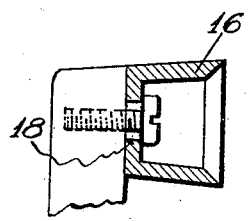
Fig. 4 is a detail of a cutter.

The main frame 10 of the machine, the cutter carriage 12 and 12ª, the model wheel carriage and width grading mechanism 13, driving mechanism and swing frame 14, are all of ordinary construction and need not be further described. For a fuller description thereof, reference may be made to the patents cited below. The cutter head 15 is of an effective diameter of about 3½ inches and has a number of cup-shaped finishing cutters 16 having slots 18 for the reception of clamping screws, whereby they may be slid toward and from the axis of the cutter head and clamped in any desired position. In Figs. 2 and 3 only the surface of revolution generated by the revolving cutter head is indicated by the numeral 15. The cutter head is mounted on the end of the shaft of the motor 20, which, together with the axis of the model wheel 22 is inclined toward and with the direction of feeding travel of the carriages, as explained in the United States Letters Patent granted on the application of F. S. Buck, No. 1,137,117, 1,330,841 and 1,361,305. I have illustrated this form of lathe since it is the best form known to me, but the present invention is equally applicable to the old-fashioned lathe with 10-inch cutter head.

The pedestal 24, in which the cutter head end of the motor shaft is supported has an extension 26, in which works vertically a slide 28 directly above the cutter head. This slide carries at its lower end a contact member of any desired form, shown as a wheel 30. The vertical position of the slide is controlled by any desired means, preferably by a micrometer screw 32, threaded into the slide and mounted in an overhanging arm 33. A reading scale 34 and a finger wheel 36 may be conveniently added.

In use the proper difference in diameter required to produce the most advantageous results with a given width grader setting will be known from experience, based on the theory given above, and the cutters 16 will be set up to contact with the wheel 30, and the adjusting screws tightened. The range of movement of the slide 28 is sufficient to permit its withdrawal out of the way of the cutter head when working.

Provision is of course made for relative adjustment of the cutter head and model wheel to enable their front faces to be brought into the same vertical plane with the axis of rotation in the swing frame when this axis is swung over to them. This may be conveniently accomplished by the adjustable slide found on the ordinary model wheel supporting pedestal.

I have found that the wheel 30 is productive of better results than a rigid gage, in that its freedom to turn prevents damage to the cutting edge, and enables a very close setting to be conveniently made.

My invention thus provides a machine by means of which the difference in diameter between cutter head and model wheel can be conveniently adjusted with entire accuracy to the value found to be most advantageous for any desired setting of the width grader, and minimum distortion at the corners of the forepart of the last may thereby be secured.

Having described my invention, what I claim as new and desire to secure by Letters Patent of the United States is:—

1. In a pattern-copying machine, a model wheel, width grading mechanism, a cutter head having blades adjustable toward and from the axis, and a gage mounted on the machine in fixed relation to the cutter head, and adjustable for setting the blades to any desired diameter.

2. In a pattern-copying machine, a model wheel, width grading mechanism, a cutter head having blades adjustable toward and from the axis, and an adjustable gage mounted rigidly on the cutter head supporting mechanism for setting the cutters to any desired diameter.

In testimony whereof I have signed my name to this specification.

LELAND B. WHIPPLE.